United States Patent
McNeill

(10) Patent No.: US 8,650,556 B2
(45) Date of Patent: Feb. 11, 2014

(54) VIRTUAL MACHINE ASYNCHRONOUS PATCH MANAGEMENT

(75) Inventor: Campbell McNeill, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 13/210,552

(22) Filed: Aug. 16, 2011

(65) Prior Publication Data

US 2013/0047147 A1 Feb. 21, 2013

(51) Int. Cl.
*G06F 9/45* (2006.01)

(52) U.S. Cl.
USPC ........................................................ 717/173

(58) Field of Classification Search
USPC ........................................................ 717/173
See application file for complete search history.

(56) References Cited

U.S. PATENT DOCUMENTS

| 7,475,389 | B2 | 1/2009 | Johnson |
| 7,933,987 | B2 | 4/2011 | Aidun et al. |
| 2004/0210653 | A1 | 10/2004 | Kanoor et al. |
| 2006/0080656 | A1 | 4/2006 | Cain et al. |
| 2006/0095520 | A1 * | 5/2006 | Berg ............................ 709/206 |
| 2007/0113225 | A1 | 5/2007 | Felts |
| 2011/0126187 | A1 | 5/2011 | Alberti et al. |
| 2011/0126193 | A1 | 5/2011 | Mullin et al. |

* cited by examiner

*Primary Examiner* — John Chavis
(74) *Attorney, Agent, or Firm* — Terrile, Cannatti, Chambers & Holland, LLP; Robert W. Holland

(57) ABSTRACT

Drone virtual machines are leveraged to support asynchronous patch management by initiating a drone virtual machine in a maintenance environment to perform a patch management update, saving the updated virtual machine and then initiating the updated virtual machine in an operational environment accessible to clients. A drone is initiated in a maintenance environment for checking patch compliance in response to a request to initiate a virtual machine so that patch updates are performed before the virtual machine initiates in an operational environment accessible to operational clients.

20 Claims, 2 Drawing Sheets

VIRTUAL MACHINE ASYNCHRONOUS PATCH MANAGEMENT

BACKGROUND OF THE INVENTION

1. Field of the Invention

The present invention relates in general to the field of information handling system virtual machines, and more particularly to virtual machine asynchronous patch management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have grown in processing capabilities, enterprises have sought to leverage improved processing capabilities through virtualization. Virtual machines are separately defined operating systems that operate within a virtual environment supported by physical processing components running over one or more host operating systems. For example, multiple host server information handling systems communicating through a network share support of multiple virtual machines by migrating virtual machines between physical resources as workload dictates. End users are presented with a virtual machine interface that performs as if the virtual machine operating system is running on specified physical resources, however, the actual physical resources that support a particular virtual machine can change transparent to the virtual machine end user. As a result, processing resource utilization increases with the distribution of workload across multiple physical resources and data security increases by limiting the impact of a failure of any particular physical resource on virtual machines using the resource.

One difficulty with the use of virtual machines is that a large number of different types of operating systems may run on a given set of physical resources. Operating systems need maintenance over time to ensure proper operation, such as compatibility with software and data security. When an operating system actively manages a set of processing resources, such as a host operating system running on a physical server information handling system, the operating system typically includes automated maintenance functions that download and install update patches. As an example, WINDOWS includes an update function that automatically downloads update patches from a MICROSOFT server location and installs the update patches to perform desired maintenance. One common maintenance function performed by patches is the correction of vulnerabilities in the operating system that make the operating system vulnerable to attacks by hackers. When multiple virtual machine operating systems run on a given set of physical processing components and host operating system, each of the virtual machine operating systems should have maintenance performed as needed, such as downloading and executing patch updates, to prevent a security breach of the physical resources. Since a wide variety of operating systems can support virtual machines with various levels of activity at a physical resource, performing patch maintenance through either manual or automated patch updates can present a significant difficulty.

Generally, virtual machine operating systems perform patch maintenance in the same manner as host operating systems. The virtual machine operating system retrieves a patch and executes the patch upgrade as if running on dedicated hardware processing components. To provide some structure in patch maintenance at physical resources that support virtual machines, patching services are available that help to administer patch updates to virtual machines, such as Shavlik's patching services. However, even after patches are applied across virtual machines, difficulties remain validating the success of updates and ensuring that deployed virtual machine images are not out of date or missing patches. In some instances, patches fail silently so that out-of-date virtual machines proceed to deployment without notice of the failure.

SUMMARY OF THE INVENTION

Therefore a need has arisen for a system and method which supports asynchronous virtual machine patch management.

In accordance with the present invention, a system and method are provided which substantially reduce the disadvantages and problems associated with previous methods and systems for performing patch management at virtual machines. A drone of a virtual machine is patched asynchronously using a maintenance environment to ensure that virtual machines that initiate in an operational environment have a valid patch compliance state.

More specifically, a patch scanner detects requests for initiation of a virtual machine to an operational environment and responds to the request by first initiating a drone of the virtual machines in a maintenance environment. The patch scanner scans the drone in the maintenance environment for compliance with a predetermined patch state. If the drone has a valid patch state, the patch scanner initiates the virtual machine in the operational environment for normal use. If the drone has an invalid patch state, the patch scanner provides patch scan results to a patch service located at an external network location so that the patch service can coordinate patch updates that will bring the drone to a valid patch state. Once the drone is brought to a valid patch compliance state, the drone is saved and then initiated in the operational environment as a virtual machine for use by clients. Upon initiation in the operational environment, the patch scanner scans the virtual machine for patch compliance to ensure proper installation of patches by the patch service.

The present invention provides a number of important technical advantages. One example of an important technical advantage is that patches are automatically deployed to virtual machines at any point in a virtual machine deployment to provide multiple ways of specializing a virtual machine image as needed for rapid deployment of updated systems. Patch installations are confirmed to avoid silent patch failures that leave a virtual machine vulnerable to malicious attacks.

Patch adherence and compliance are controlled as a part of the patching and image deployment process so that new virtual machine images will not be candidates for deployment until patch validation criteria are met. Automated patch management provides improved data security by ensuring that virtual machines remain up-to-date with patch installations that help to prevent malicious attacks.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Asynchronous patching of virtual machines running on information handling systems ensures that virtual machine images deployed to an operational environment will have compliance with current patch standards. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
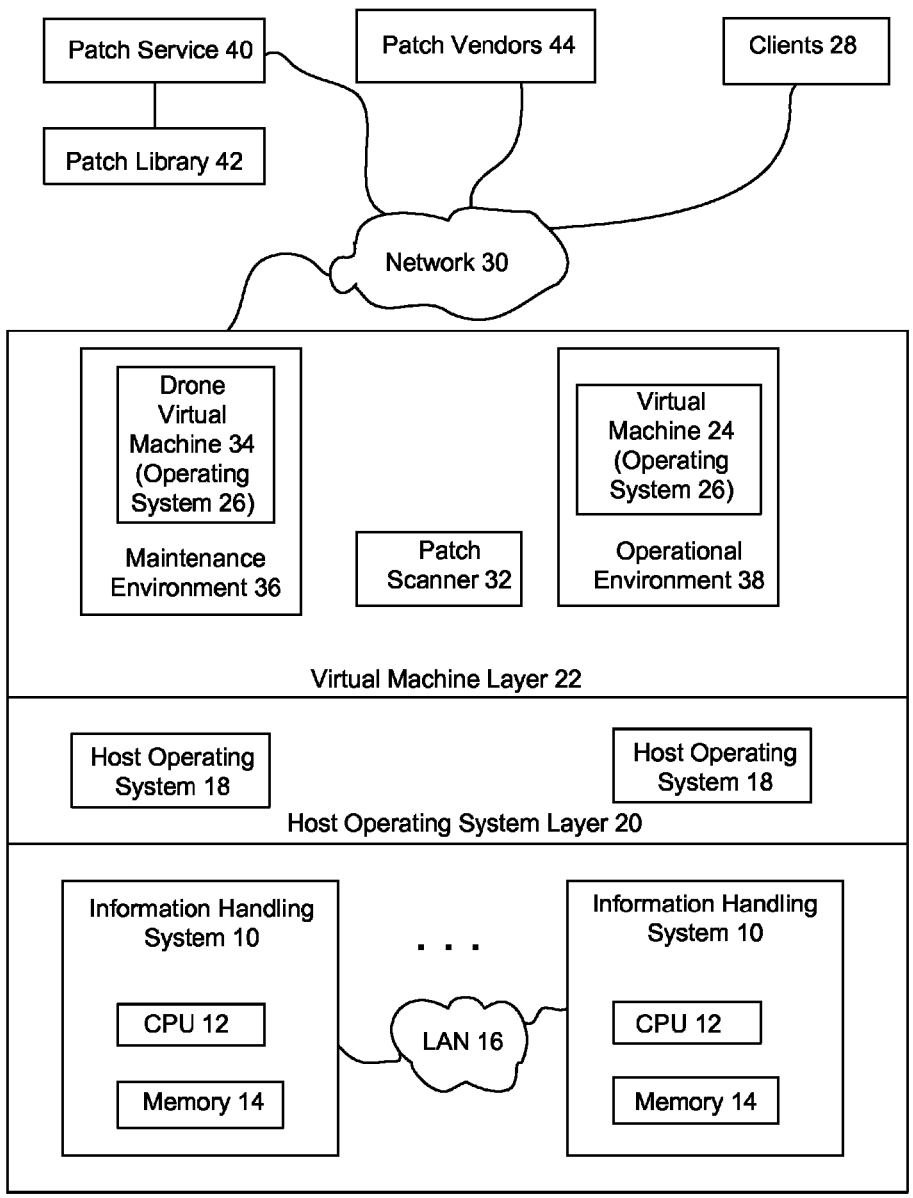
FIG. 1 depicts a block diagram of a system for asynchronous patch management of virtual machines.

Referring now to FIG. 1, a block diagram depicts a system for asynchronous patch management of virtual machines. Physical information handling systems 10, such as servers, execute instructions with processing components, such as CPUs 12 and memory 14. Memory 14 includes RAM to store instructions during execution and non-volatile memory that stores virtual machine images for execution, such as one or more hard disk drives or networked storage like a storage area network. Plural information handling systems 10 share workload through network communications, such as a local area network 16. Each physical information handling system 10 coordinates the execution of instructions with a host operating system 18 in a host operating system layer 20. A virtual machine layer 22 executes over the host operating system layer to support simultaneous execution of plural virtual machines 24. For example, each virtual machine 24 runs applications under the management of a virtual machine operating system 26. To clients 28 interfaced through an external network 30, virtual machines 24 appear and interact as physical information handling systems running on dedicated physical resources. For example, virtual machines 24 can run applications over a WINDOWS client or server operating system to perform client or server functions that present a desktop to an end user. Advantageously, virtual machines 24 do not have to be tied to a particular physical information handling system so that workloads are more easily shared across physical processing resources by migrating virtual machines between physical information handling systems 10.

Like operating systems that execute over physical information handling systems, operating systems that support virtual machines typically have updates issue in the form of patches for security updates or similar purposes. Conventional operating systems executing over physical information handling systems generally include patch components that retrieve patches from patch vendors and then execute the patches with the operating system to upgrade the operating system to a valid patch state. Virtual machine operating systems can typically use the same patch structure to perform patch updates, although patching services, such as Shavlik's patching service, can provide a patch update structure to aid with virtual machine updates. Until a virtual machine is in a valid patch state, a risk exists that a malicious program will use that virtual machine to invade the physical processing components and cause damage. In addition to patches for operating systems, other types of applications include a patching structure to get the applications up to date.

In order to ensure that a virtual machine has a desired state of patches installed, a patch scanner 32 monitors for virtual machine initiations and ensures compliance by the virtual machine with a desired patch compliance state. Upon detecting a request to initiate a virtual machine, such as a new installation environment, patch scanner 32 initiates a drone 34 of the virtual machine in a maintenance environment 36 instead of initiating the virtual machine in an operational environment 38. Maintenance environment 36 runs on a maintenance operating system that limits access of the drone to processing resources and to operational clients 28. In alternative embodiments, other methods for isolating a maintenance environment may be used so that the drone has the image of the virtual machine without the ability to interact with operational clients of the virtual machine. Operational environment 38 provides access by virtual machine 24 to processing resources and clients according to normal operational permissions. Drone virtual machine 34 is a clone of operational virtual machine 24 but runs in an environment where malicious software has limited risk of causing difficulties because access permissions are limited and drone virtual machine 34 does not perform operational functions.

Once drone virtual machine 34 is running in maintenance environment 36, patch scanner 32 scans drone virtual machine 34 for compliance with a defined set of patches of a valid patch state. If drone virtual machine 34 has a valid patch status, patch scanner 32 closes drone virtual machine 34 and initiates virtual machine 24 in operational environment 38 to have access according to normal operational permissions. If drone virtual machine 34 has an invalid patch status, such as the lack of an installation of a patch update, the scan results are forwarded to a patch service 40 located at a distal network location to coordinate execution of patches needed to have a valid patch state. Patch service 40 obtains needed patches from local library 42 or a patch vendor 44, and coordinates installation of the patches at drone virtual machine 34. For example, patch service 40 downloads patches for execution on drone virtual machine 34 in maintenance environment 36, downloads patch information to copy into drone virtual machine 34 in the maintenance environment, or migrates drone virtual machine 34 to patch service 40 for execution of patches at patch service 40. In one embodiment, the drone machine is migrated to patch service 40 and then implemented on a physical information handling system to allow patch management through interactions with the physical information handling system at the patch service network location. This allows greater assurance to the customers of the patch service that patches are accomplished and the image of the virtual machine is operational. Once drone virtual machine 34 has a valid patch state, patch scanner 32 saves drone virtual machine 34 to memory 14 and initiates drone virtual machine 34 to operational environment 38 as operational virtual machine 24. By having patch service 40 at a network location distal from and separate from patch scanner 32, malicious code is restricted from transferring to patch service 40. Once virtual machine 24 is running in operational environment 38, patch scanner 32 runs an additional patch scan to verify that patches were properly installed. If virtual machine 24 does not have a valid patch state, operation of virtual machine 24 in operational environment 38 is halted and the asynchronous patch update is repeated.

In alternative embodiments, patch scanner 32 provides alternatives for ensuring compliance with a predetermined patch status by performing asynchronous patch management with drone virtual machines. For example, a virtual machine 24 in an operational state has a drone virtual machine created in a maintenance environment 36 for a scan by patch scanner 32. While patch updates are performed asynchronously, changes to virtual machine 24 are tracked and stored so that the changes can be re-created at a later time. Once asynchronous updates to drone virtual machine 34 are complete, drone virtual machine 34 is stored in memory 14 and re-initiated in operational environment 38 as virtual machine 24. Changes to virtual machine 24 that occurred since creation of drone virtual machine 34 are re-created in the operational environment to complete asynchronous patch updates.

Figure 2:
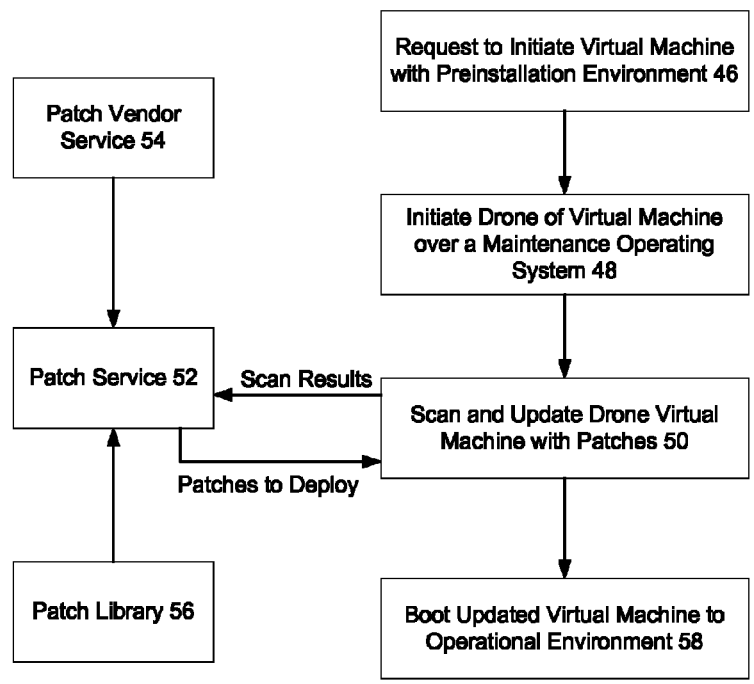
FIG. 2 depicts a flow diagram of a process for asynchronous patch management of virtual machines.

Referring now to FIG. 2, a flow diagram depicts a process for asynchronous patch management of virtual machines. The process begins at step 46 with a request to initiate a virtual machine to an operational environment, such as staging virtual machine content with a management operating system in a preinstallation environment. Upon detection of initiation of the virtual machine, at step 48 a drone virtual machine initiates in the management environment. At step 50, a patch scanner executes to scan the drone virtual machine for compliance with a predetermined patch state. If the scan indicates an invalid patch compliance state, scan results from the patch scanner are forwarded at step 52 to a patch service. At step 52, the patch service analyzes the scan results to obtain missing patch updates from a patch download vendor service at step 54 of from a library of the patch services at step 56. At step 52, the patch service packages patch updates needed to bring the drone virtual machine to a valid patch state and returns to step 50 for coordination of patch update execution on the drone virtual machine in the maintenance environment. Once the patches are executed on the drone virtual machine, the process continues to step 58 to save the drone virtual machine in non-volatile memory as the operational virtual machine and to initiate the operational virtual machine in the operational environment. Once the operational virtual machine is executing in the operational environment, the patch scanner can again scan the operational virtual machine to ensure that a valid patch state was accomplished by the patch update.

Although the present invention has been described in detail, it should be understood that various changes, substitutions and alterations can be made hereto without departing from the spirit and scope of the invention as defined by the appended claims.

What is claimed is:

1. A method for patch management of virtual machines, the method comprising:
   detecting deployment of a virtual machine at a first network location;
   in response to the detecting, mounting a drone of the virtual machine at the first network location in a management environment;
   scanning the drone at the first network location to detect a patch compliance state;
   communicating the patch compliance state to a patch service at a second network location;
   applying one or more patches to the drone with the patch service based upon the patch compliance state; and
   saving the drone as the virtual machine at the first network location; and
   deploying the virtual machine at the first network location in an operational environment.

2. The method of claim 1 further comprising:
   detecting deployment of the virtual machine at the first network location in the operational environment;
   scanning the virtual machine in the operational environment to detect a patch compliance state; and
   performing the deployment of the virtual machine at the first network location if the patch compliance state is valid.

3. The method of claim 2 further comprising:
   halting the deployment of the virtual machine at the first network location operational environment if the patch compliance is not valid; and
   in response to the halting, returning the virtual machine to the management environment.

4. The method of claim 1 wherein applying one or more patches to the drone with the patch service based upon the patch compliance state further comprises:
   storing a library of patches at the second network site; and
   retrieving patches from the library to bring the patch compliance state to a valid state.

5. The method of claim 1 wherein applying one or more patches to the drone with the patch service based upon the patch compliance state further comprises:
   interfacing with patch resources from the second network site through a network; and
   retrieving patches from the patch resources to bring the patch compliance state to a valid state.

6. The method of claim 1 wherein applying one or more patches to the drone with the patch service based upon the patch compliance state further comprises:
   copying the drone to the second network site;
   executing the patch on the drone at the second network site; and
   returning the drone to the first network site.

7. The method of claim 1 wherein applying one or more patches to the drone with the patch service based upon the patch compliance state further comprises:
   downloading the one or more patches from the second network location to the first network location; and
   executing the one or more patches on the drone in the management environment.

8. The method of claim 1 wherein applying one or more patches to the drone with the patch service based upon the patch compliance state further comprises:
   identifying information generated by executing the one or more patches; and
   copying the identified information from the second network location to the drone at the first network location to bring the drone to a valid patch compliance state.

9. A system for maintaining virtual machines, the system comprising:
- plural information handling systems, each information handling system having processing components to support a host operating system;
- a host operating system executing on each of the plural information handling systems to support virtual machine environments;
- a maintenance virtual machine environment running over one or more of the host operating systems;
- an operational virtual machine environment running over one or more of the host operating systems; and
- a patch scanner operating on one or more of the information handling systems, the patch scanner operable to detect initiation of a virtual machine and in response to the detecting to initiate a drone of the virtual machine in the maintenance virtual machine environment for confirmation of a valid patch compliance state at the drone before initiation of the virtual machine in the operational virtual machine environment.

10. The system of claim 9 wherein the patch scanner is further operable to detect an invalid patch compliance state and in response to detecting the invalid patch compliance state to initiate an update of the drone with a patch service through a network interface.

11. The system of claim 10 wherein the patch scanner initiates the update of the drone by downloading patches from the patch service and executing the patches with the drone.

12. The system of claim 10 wherein the patch scanner initiates the update of the drone by downloading patch information from the patch service and copying the patch information to the drone.

13. The system of claim 10 wherein the patch scanner initiates the update of the drone by communicating a copy of the drone to the patch service and retrieving the drone with updates executed by the patch service.

14. The system of claim 10 wherein the patch scanner is further operable to save the drone after an update to a valid patch compliance state and to initiate the saved drone as the virtual machine in the operational environment.

15. The method of claim 14 wherein the patch scanner is further operable to scan the virtual machine in the operational environment for a valid patch compliance state.

16. A method for maintaining virtual machines, the method comprising:
- responding to a request to initiate a virtual machine from storage to an operational environment by initiating the virtual machine to a maintenance environment;
- scanning the virtual machine in the maintenance environment for compliance with a predetermined patch state;
- interfacing the virtual machine with a patch service through a network if not compliant with the predetermined patch state to update the virtual machine to the predetermined patch state;
- saving the updated virtual machine to the storage; and
- initiating the updated virtual machine to the operational environment in response to the request.

17. The method of claim 16 wherein interfacing the virtual machine with a patch service through a network further comprises downloading one or more patches from the patch service for execution on the virtual machine in the maintenance environment.

18. The method of claim 16 wherein interfacing the virtual machine with a patch service through a network further comprises downloading patch information from the patch service to replace information of the virtual machine.

19. The method of claim 16 wherein interfacing the virtual machine with a patch service through a network further comprises copying the virtual machine through the network to the patch service for execution of one or more patches at the patch service.

20. The method of claim 16 further comprising scanning the virtual machine in the operational environment for compliance with the predetermined patch state.

* * * * *